United States Patent
Cucchi

(10) Patent No.: US 7,159,495 B2
(45) Date of Patent: Jan. 9, 2007

(54) BAR MAGAZINE FOR LATHES WITH BAR CENTERING MEANS IN THE MAGAZINE CHANNEL

(75) Inventor: Pietro Cucchi, Bussero (IT)

(73) Assignee: Pietro Cucchi S.p.A., Bussero (IT)

( * ) Notice: Subject to any disclaimer, the term of this patent is extended or adjusted under 35 U.S.C. 154(b) by 0 days.

(21) Appl. No.: 11/069,503

(22) Filed: Mar. 1, 2005

(65) Prior Publication Data

US 2005/0193878 A1    Sep. 8, 2005

(30) Foreign Application Priority Data

Mar. 2, 2004    (IT)    .......................... MI2004A0385

(51) Int. Cl.
*B23B 13/08*    (2006.01)
(52) U.S. Cl. .............................. 82/126; 82/127; 82/162; 82/164
(58) Field of Classification Search ................. 82/162, 82/126, 127, 164; 414/431, 745.1; *B23B 13/08*
See application file for complete search history.

(56) References Cited

U.S. PATENT DOCUMENTS

| | | | | |
|---|---|---|---|---|
| 3,093,957 A | * | 6/1963 | Tetreault ...................... | 57/122 |
| 3,606,807 A | * | 9/1971 | Rast ............................ | 82/162 |
| 4,221,419 A | * | 9/1980 | Riley et al. ................. | 294/106 |
| 4,382,591 A | * | 5/1983 | Minnis et al. .............. | 269/156 |
| 4,604,924 A | * | 8/1986 | Cucchi et al. ............... | 82/126 |
| 4,700,593 A | * | 10/1987 | Cucchi ......................... | 82/127 |
| 4,776,200 A | * | 10/1988 | Fabbri ........................ | 72/428 |
| 5,938,259 A | * | 8/1999 | Sawdon et al. ............ | 294/116 |

\* cited by examiner

*Primary Examiner*—Monica Carter
*Assistant Examiner*—Sara Addisu
(74) *Attorney, Agent, or Firm*—Shlesinger Fitzsimmons

(57) ABSTRACT

A bar magazine for lathes includes at least one channel designed to receive a bar being machined and pushed along the channel by a bar-pusher collet. The magazine includes at least one bar centering member arranged in a zone along the channel. The bar centering member is movable, upon passage of the collet in the zone, between a first position of engagement with the bar for to center the bar in the channel and a second position removed from the bar to allow passage of the bar-pusher collet through the zone.

16 Claims, 2 Drawing Sheets

BAR MAGAZINE FOR LATHES WITH BAR CENTERING MEANS IN THE MAGAZINE CHANNEL

BACKGROUND OF THE INVENTION

1. Field of the Invention

The present invention relates to a bar magazine for lathes equipped with a bar-centering instrument designed principally to attenuate the vibrations of the bar in the loading channel and in particular during high speed machining of small-diameter bars.

2. State of the Prior Art

The problem of avoiding vibrations of bars in the channels of magazines and holding them in the correct position during machining in lathes (for example a plurimandrel lathe) is known in the prior art. In particular, there are serious problems when the bars have a diameter much smaller than that of the magazine channel and when the machining is done at high rotation speeds as often happens in the more modern machines. Under these conditions, indeed, the vibrations are quite accented and, in addition to causing considerable noise, they lead to the production of machined pieces out of tolerance.

To remedy these problems it is proposed to insert adaptors to be fitted in the channel so as to leave little freedom of movement to the bar and thus reduce its vibrations. However, this solution brings on the need to replace the entire bar-pusher each time it is desired to machine a small-diameter bar. This fact, in addition to the need of having available several bar-pushers with different dimensions, also involves the need to stop the machine for long periods to insert the adaptors in the channel and change the bar-pusher. It is also noted that when the bar is shaped (for example with a hexagonal or square cross section) the diameter reduction proposed in the prior art causes considerable vibration problems contrary to what is desired.

The general purpose of the present invention is to remedy the above mentioned shortcomings by making available a lathe bar-magazine which would avoid strong vibration of the bars, even when their diameter is much less than the diameter of the channel and the rotation speed of the bar is high, while avoiding having to stop the machine for long periods when changing the diameter of the bar being machined.

Another purpose of the present invention is to make available a bar magazine for lathes that while ensuring satisfactory centering of small-diameter bars in the loading channel would keep a simple and economical structure compared with prior art magazines.

SUMMARY OF THE INVENTION

In view of this purpose it was sought to provide in accordance with the present invention a mono or plurimandrel bar magazine for lathes including at least one channel designed to receive in it a bar being machined and pushed along the channel by a bar-pusher collet with said magazine including at least one bar centering member arranged in a zone along the channel and characterized in that said centering member is movable upon passage of the collet in said zone between a first position of engagement with the bar for its centering in the channel and a second position removed from the bar to allow passage of the bar-pusher collet through said zone.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
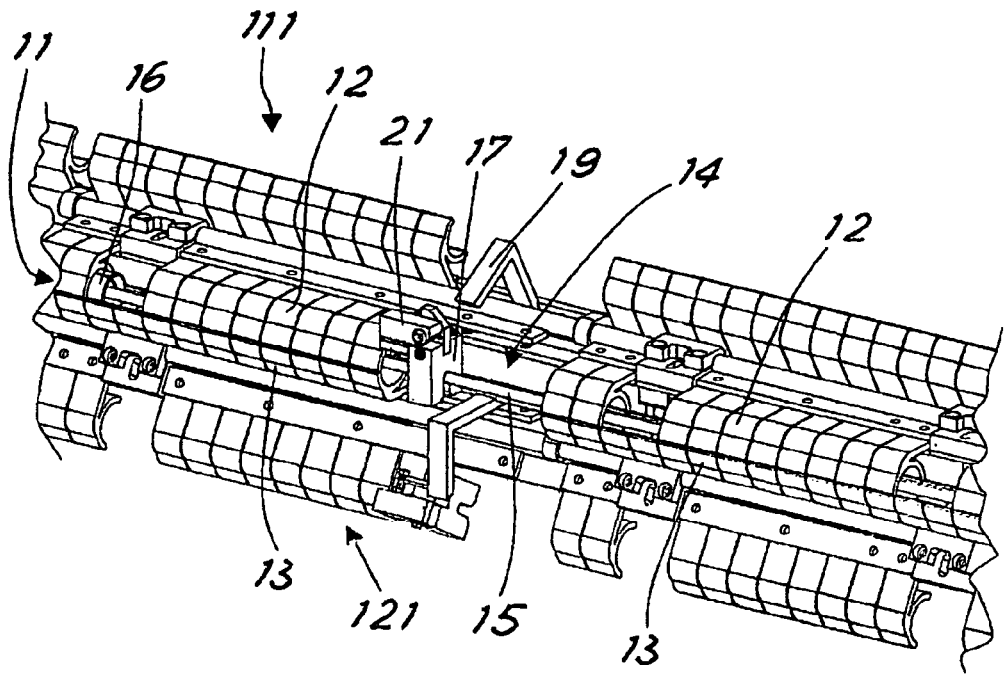
FIG. 1 shows a perspective view of a part of a bar magazine for plurimandrel lathes with the centering member engaged on the bar.

With reference to the figures, FIG. 1 shows a portion of a bar magazine in a plurimandrel lathe. In particular said FIG shows a loading channel 11 and, beside it, two other loading channels 111 and 121 shown only partially. In channel 11 is arranged a bar 15 being machined having diameter considerably less than the diameter of the channel 11. Said bar 15 for example could rotate at high speed as often happens in the more modern machines.

The bar 15 is upheld at one end by the bar-pushing collet 16 which is designed to run in the channel to advance the bar being machined in the magazine. Said collet 16 is prior art and not further described. At its opposite end the bar 15 is supported in a mandrel of the lathe (not shown in the figure) arranged near one of the workstations of the plurimandrel lathe (not shown).

Advantageously the channel 11 is made in two parts, to wit an upper 12 and a lower 13. The upper part 12 (having a virtually semicylindrical half-shell form) is movable with respect to the lower part 13 to allow opening of the channel at the end of machining and loading of the machine with a new bar to be machined.

In one embodiment of the present invention the channel 11 similarly to the other channels of the magazine is provided with an open portion 14. Opposite the open portion 14 is arranged a centering member 17 designed to engage with the bar 15 being machined to hold it in the correct position in the channel and attenuate its undesired vibration.

Figure 2:
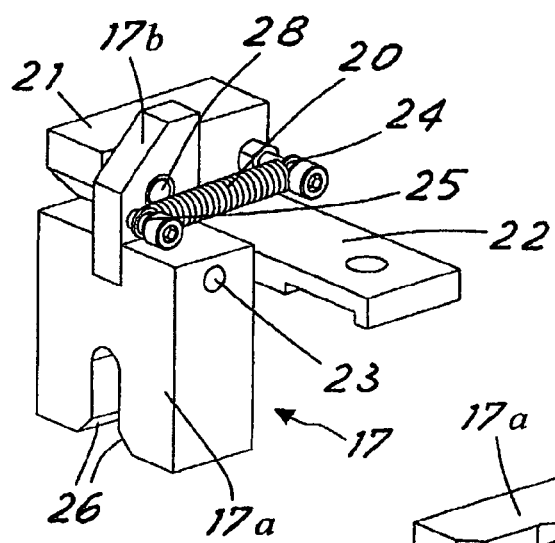
FIG. 2 shows a detailed view of the centering member in the engaged position.
Figure 3:
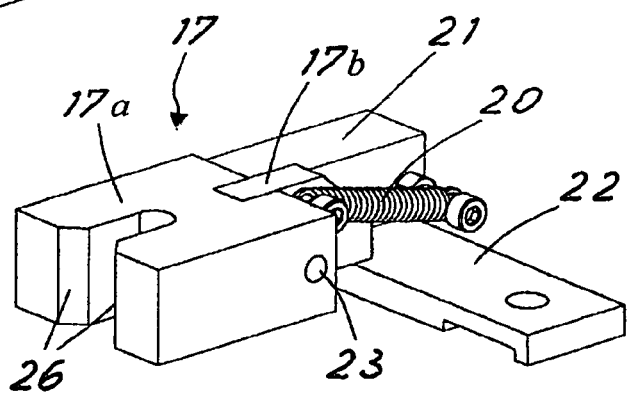
FIG. 3 shows a view of the centering member in the position removed from the bar.

The centering member 17 as shown in FIGS. 2 and 3 includes a fork 17a fastened rigidly to a body 17b through a generic fastening member 23. The fork 17a is movable between a position of engagement with the bar (FIG. 2) and a raised position removed from the bar (FIG. 3). This movability is made possible by the hinging 28 of the body 17b to the support 21. Said support 21 is fastened to an arm 22 which is in turn fastened to the frame of the magazine. It is noted that in one embodiment of the present invention the arm 22 and the support 21 are fastened so as to be integral with the movable upper part 12 of the channel 11.

In the position engaged with the bar (see FIGS. 1 and 2) the fork 17a is arranged perpendicular to the bar while in the removed position it takes a position virtually parallel to the bar 15. It is noted that these two positions are steadied by the action of a spring 20 fastened at one of its ends 25 to the body 17b of the centering member and at the other end 24 to the support 21. Advantageously the body 17b of the centering member includes appropriate even surfaces for engaging permanently with the support 21 in the two aforesaid positions of the fork 17a. It is noted that the fork 17a preferably has at the ends of its arms two bevels 26 designed to aid insertion of the bar 15 on the bottom of the fork 17a. Expediently the bottom of the fork is shaped in an arc of a circle with a diameter slightly greater than the diameter of the bar to be centered. For example, the diameter of the bottom could be approximately 3 to 4 tenths of a mm greater than the diameter of the bar to be centered. For example, the diameter of the bottom could be approximately 3 to 4 tenths of a mm greater than the diameter of the bar. It is also noted that the fork 17a can be made of plastic, for example DELRIN.

Figure 4:
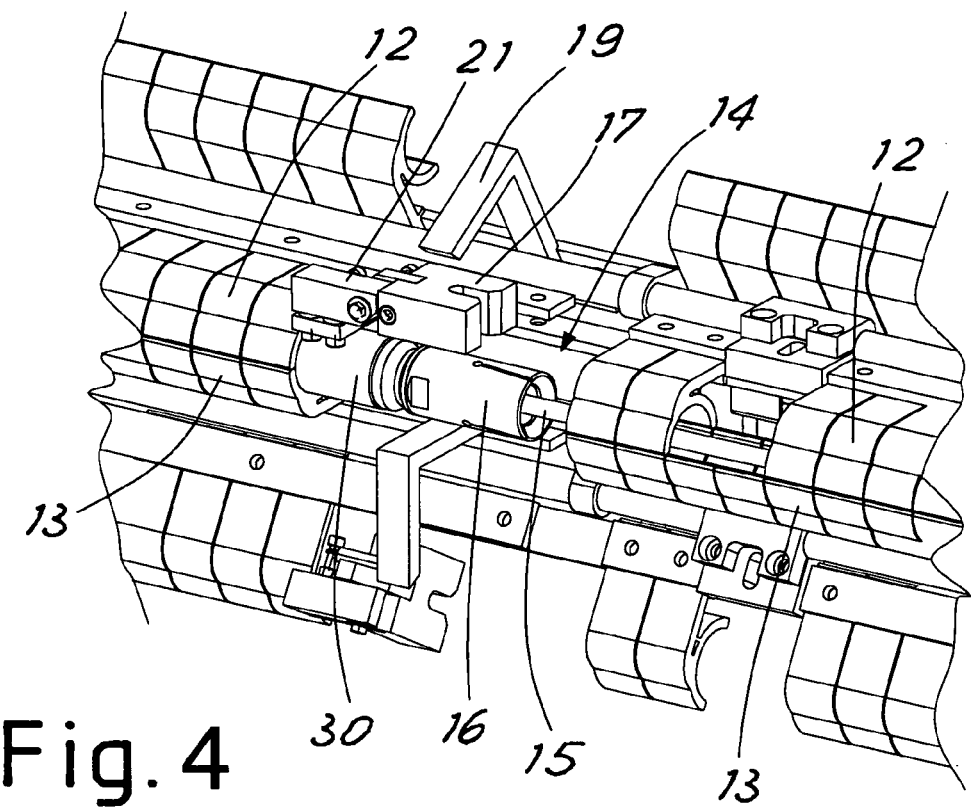
FIG. 4 shows a view of a part of the magazine with the centering member raised.

In its position raised from the bar the fork 17a is arranged outside the volume swept by the collet 16 inside the channel 11 when the latter moves to push the bar 15 along the channel 11. On this point, see FIG. 4 showing the fork 17a in its raised position removed from the bar. When the collet 16 advances along the channel 11 it touches with its front part the fork 17a and moves it against the action of the spring 20 until it causes it to be released from the position engaged with the bar at the steady position removed from the bar and parallel thereto. In this manner the collet 16 can pursue regularly its travel along the channel 11 without the need of a smaller collet as occurred with the adaptors inserted in the channel in accordance with the prior art. FIG. 4 also shows collet moving means 30 known in themselves and therefore not further described herein.

Figure 5:
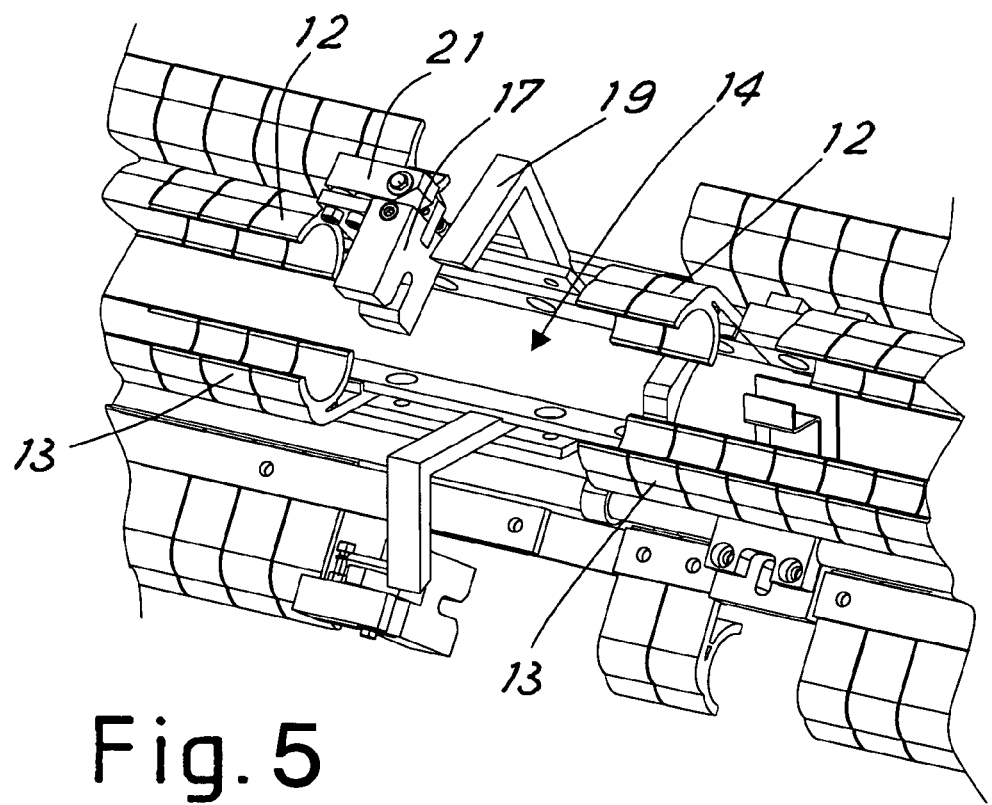
FIG. 5 shows a view of a part of the magazine when the loading channel is opened.

FIG. 5 shows the opening step of the channel 11 when machining of the bar is finished and a new bar is prepared for loading and machining. The presence of an L-shaped striker 19 fastened integrally to the fixed lower part 13 of the channel 11 is noted in particular. When the movable upper part 12 rises to open the channel, it is dragged behind the centering member 17 that goes to touch the striker 19. As shown in the figure, the fork 17a is then made to again spring into its position perpendicular to the extension of the channel 11 ready to engage with the new bar that will be loaded in the channel.

It is now clear that the preset purposes have been achieved. Indeed, a bar-magazine for lathes (in particular for plurimandrel lathes) allowing centering the bar being machined in the loading channel even when the bars have a diameter considerably smaller than the channel diameter and avoiding strong vibrations during machining has been realized. This result was achieved without the need of setting up the magazine (for example by replacing the bar-pusher or inserting adaptors along the channel) each time the diameter of the bar being machined changes. This way, long stops in the machine causing reduction of productivity of the machinery are avoided. In addition, the magazine in accordance with the present invention has kept a simple and economical structure as a whole with the only addition being a simple centering tool that is operated and made to spring into its operating positions by using the movements that were already called for in the lathe's machining cycle.

Naturally, the above description of an embodiment applying the innovative principles of the present invention is given by way of non-limiting example of said principles within the scope of the exclusive right claimed here. For example, depending on the type of magazine, the centering members arranged along the channel could be more than one. The fork could be made in two parts to be able to adjust the breadth of the fork and ensure correct restraint of the oscillations of the bar even when it is desired to machine bars with different diameters.

What is claimed is:

1. Bar magazine for mono and plurimandrel lathes including at least one channel designed to receive a bar being machined, the bar being pushed along the channel by a bar-pusher collet, said magazine including at least one bar-centering member arranged in a zone along the channel, said centering member being movable upon passage of the collet in said zone between a first position of engagement with the bar for centering the bar in the channel and a second position removed from the bar to allow passage of the bar-pusher collet through said zone, said centering member further being hinged to a support fastened integrally to a wall of the channel with a hinging for rotation between said first position and said second position, with said hinging being transversal to the bar.

2. Bar magazine for lathes in accordance with claim 1 characterized in that said centering member includes a fork comprising at least two arms, the fork being designed to receive the bar between its arms in said first engagement position.

3. Bar magazine for lathes in accordance with claim 2 characterized in that said fork is substantially perpendicular to the bar in the first engagement position and substantially parallel to the bar in the second position.

4. Bar magazine for lathes in accordance with claim 3 characterized in that said centering member is connected to said support through a spring and has two striker surfaces for engaging with said support in said first and second positions with said two positions being steadied by action of the spring.

5. Bar magazine for lathes in accordance with claim 4 characterized in that advancement of the collet along the channel until the collet passes a point at which the fork is arranged causes the centering member to rotate until the centering member causes itself to spring from the first engagement position to said second position removed from the bar.

6. Bar magazine for lathes in accordance with claim 4 characterized in that the channel is made up of two half-shells, a first of the two half-shells being movable to selectively open the channel at a completion of machining, said support of the centering member being integral with said first half-shell of the channel, and a striker designed to engage with the centering member to cause the centering member to spring from the second position to the first position when the two half-shells of the channel open.

7. Bar magazine for lathes in accordance with claim 4 characterized in that said centering member is made in two parts, one of which is the fork, the other of which is a body hinged to the support and connected to said spring with, the fork being fastened rigidly to said body.

8. Bar magazine for lathes in accordance with claim 2 characterized in that end parts of the fork arms are beveled to facilitate insertion of the bar in the fork.

9. Bar magazine for lathes in accordance with claim 2 characterized in that the fork is made of plastic.

10. Bar magazine for lathes in accordance with claim 2 characterized in that a bottom of the fork is shaped as an arc of a circle with diameter 3 to 4 tenths of a millimeter greater than a diameter of a bar being machined.

11. The bar magazine of claim 9 wherein the plastic is DELRIN.

12. Bar magazine for lathes in accordance with claim 1 characterized in that said centering member is arranged along the channel where an opening is present in the wall of the channel.

13. Bar magazine for lathes in accordance with claim 1 characterized in that the channel is made up of two half-shells with the first of these being movable for opening of the channel at the end of machining and with said support of the centering member being integral with said first half-shell of the channel.

14. Bar magazine for lathes in accordance with claim 1 characterized in that the magazine includes a plurality of parallel channels for multiple bar feeding.

15. Bar magazine for mono and plurimandrel lathes including at least one channel designed to receive a bar being machined, the bar being pushed along the channel by a bar-pusher collet, said magazine including at least one bar-centering member arranged in a zone along the channel, said centering member being movable upon passage of the collet in said zone between a first position of engagement with the bar for centering the bar in the channel and a second position removed from the bar to allow passage of the bar-pusher collet through said zone, said centering member being hinged to a support fastened integrally to a wall of the channel with a hinging for rotation between said first position and said second position, with said hinging being transversal to the bar, so that the centering member lied in a plane substantially perpendicular to the bar when it is in said first engagement position and lies in a plane substantially parallel to the bar when it is in said second position.

16. Bar magazine for mono and plurimandrel lathes including at least one channel designed to receive a bar being machined, the bar being pushed along the channel by a bar-pusher collet, said magazine including at least one bar-centering member arranged in a zone along the channel, said centering member being movable upon passage of the collet in said zone between a first position of engagement with the bar for centering the bar in the channel and a second position removed from the bar to allow passage of the bar-pusher collet through said zone, said centering member being hinged to a support fastened integrally to a wall of the channel with a hinging for rotation between said first position and said second position, with said hinging being transversal to the bar, rotation of the bar-centering member from said first engagement position to said second position removed from the bar being caused by advancement of the bar-pusher collet along the channel until the collet passes a point at which said centering member is arranged.

* * * * *